(12) United States Patent
Chen et al.

(10) Patent No.: US 9,132,884 B2
(45) Date of Patent: Sep. 15, 2015

(54) BICYCLE DERAILLEUR

(75) Inventors: Ted Chen, Wurih Township (TW); Andreas Benz, Mainberg (DE); Georg Blaschke, Geldersheim (DE); Robert Boehm, Mainberg (DE)

(73) Assignee: SRAM, LLC, Chicago, IL (US)

( * ) Notice: Subject to any disclaimer, the term of this patent is extended or adjusted under 35 U.S.C. 154(b) by 615 days.

(21) Appl. No.: 11/961,915

(22) Filed: Dec. 20, 2007

(65) Prior Publication Data

US 2008/0153641 A1 Jun. 26, 2008

(30) Foreign Application Priority Data

Dec. 20, 2006 (DE) .......................... 10 2006 060 221

(51) Int. Cl.
*F16H 9/00* (2006.01)
*F16H 59/00* (2006.01)
*F16H 61/00* (2006.01)
*F16H 63/00* (2006.01)
*B62M 9/126* (2010.01)

(52) U.S. Cl.
CPC .................................... *B62M 9/126* (2013.01)

(58) Field of Classification Search
CPC .. B62M 9/126; B62M 9/1248; B62M 9/1242; B62M 9/1244; B29C 66/1122
USPC ..................................................... 474/80, 82
See application file for complete search history.

(56) References Cited

U.S. PATENT DOCUMENTS

| | | | | | |
|---|---|---|---|---|---|
| 2,756,354 | A | * | 7/1956 | Baron .............................. | 310/43 |
| 3,085,821 | A | * | 4/1963 | Ryck ............................... | 403/26 |
| 3,125,778 | A | * | 3/1964 | Schutte ...................... | 15/250.34 |
| 3,181,383 | A | * | 5/1965 | Juy ................................. | 474/82 |
| 3,313,177 | A | * | 4/1967 | Mueller ....................... | 74/594.6 |
| 3,364,762 | A | * | 1/1968 | Maeda ............................ | 474/82 |
| 3,896,679 | A | * | 7/1975 | Huret et al. ..................... | 474/82 |
| 4,002,080 | A | * | 1/1977 | Huret et al. ..................... | 474/82 |
| 4,058,020 | A | * | 11/1977 | Huret et al. ..................... | 474/80 |
| 4,198,874 | A | * | 4/1980 | Nagano et al. .................. | 474/82 |
| 4,226,131 | A | * | 10/1980 | Yamasaki ...................... | 474/82 |
| 4,331,433 | A | * | 5/1982 | Marius ............................ | 474/79 |
| 4,348,198 | A | * | 9/1982 | Shimano ........................ | 474/82 |
| 4,403,978 | A | * | 9/1983 | Huret ............................. | 474/82 |
| 4,406,643 | A | * | 9/1983 | Shimano ........................ | 474/82 |
| 4,423,540 | A | * | 1/1984 | Hishida .......................... | 29/460 |
| 4,433,963 | A | * | 2/1984 | Shimano ........................ | 474/80 |
| 4,541,649 | A | * | 9/1985 | Grunfeld .................... | 280/281.1 |
| 4,580,327 | A |   | 4/1986 | Juy | |
| 4,670,000 | A | * | 6/1987 | Nagano .......................... | 474/80 |
| 4,742,728 | A | * | 5/1988 | Nagano .......................... | 74/488 |
| 4,744,784 | A | * | 5/1988 | Nagano .......................... | 474/80 |
| 4,832,667 | A | * | 5/1989 | Wren ............................ | 474/140 |
| 4,895,553 | A | * | 1/1990 | Nagano .......................... | 474/80 |

(Continued)

FOREIGN PATENT DOCUMENTS

| | | |
|---|---|---|
| DE | 25 03 532 A1 | 7/1975 |
| DE | 198 16 406 A1 | 10/1999 |

(Continued)

*Primary Examiner* — Henry Liu

(74) *Attorney, Agent, or Firm* — Milan Milosevic; Lisa Serdynski

(57) ABSTRACT

A chain guide of a bicycle derailleur for displacing a chain between gears that includes inner and outer side plates, a pivot shaft and a thermoplastic connector. The pivot shaft pivotably connects the chain guide to the bicycle derailleur. The thermoplastic connector injection molds the pivot shaft to one of the inner and outer side plates.

19 Claims, 4 Drawing Sheets

(56) References Cited

U.S. PATENT DOCUMENTS

| | | | |
|---|---|---|---|
| 5,190,500 A * | 3/1993 | Schwerdhoefer | 474/80 |
| 5,456,637 A * | 10/1995 | Chang | 474/78 |
| 5,836,844 A * | 11/1998 | Yoshida | 474/80 |
| 5,842,711 A * | 12/1998 | Legerot | 280/281.1 |
| 6,123,353 A * | 9/2000 | Bennett et al. | 280/281.1 |
| 6,350,212 B1* | 2/2002 | Campagnolo | 474/80 |
| 6,528,922 B2* | 3/2003 | Lee | 310/239 |
| 6,641,495 B2* | 11/2003 | Valle | 474/80 |
| 6,685,586 B2* | 2/2004 | Dal Pra' | 474/82 |
| 6,761,187 B1* | 7/2004 | Zoellner | 138/89 |
| 6,837,815 B2* | 1/2005 | Meggiolan | 474/82 |
| 2005/0250608 A1 | 11/2005 | Dal Pra' | |
| 2005/0272541 A1* | 12/2005 | Valle et al. | 474/80 |

FOREIGN PATENT DOCUMENTS

| | | |
|---|---|---|
| DE | 101 58 827 A1 | 8/2002 |
| DE | 10 2004 027 031 A1 | 1/2006 |
| EP | 0 163 583 B1 | 12/1985 |
| EP | 0 461 053 A1 | 12/1991 |
| EP | 0 558 425 B1 | 9/1993 |
| FR | 2 637 249 | 4/1990 |

* cited by examiner

BICYCLE DERAILLEUR

BACKGROUND OF THE INVENTION

The present invention relates to bicycle derailleurs, and more particularly, to a bicycle derailleur having a chain guide that includes a thermoplastic connector between a pivot shaft and a side plate.

Typically, front and rear derailleurs include a chain guide that displaces a chain between gears, the chain guide displaceable relative to the bicycle frame about a pivot shaft. The chain guide generally includes inner and outer side plates, two pulleys disposed therebetween and the pivot shaft. The pivot shaft pivotably connects the chain guide to a chain guide receptacle or a knuckle of the derailleur and may serve as an axis for one of the pulleys. The highly loaded pivot shaft is usually made of a high-strength material, such as steel, while a lightweight material, such as aluminum or a fiber-reinforced material, may be used for the side plates.

U.S. Pat. No. 6,685,586 ('586) discloses one method of attaching a high-strength metallic pivot shaft to a lightweight carbon fiber outer side plate. The outer side plate includes an opening for receiving the pivot shaft, the pivot shaft attached to the outer side plate with caulking, resulting in a non-positive connection with respect to material shape and tolerance and proper alignment of the pivot shaft.

SUMMARY OF THE INVENTION

The present invention provides a chain guide for a bicycle derailleur that displaces a chain between gears. The chain guide generally includes inner and outer side plates, a pivot shaft and a thermoplastic connector. The pivot shaft pivotably connects the chain guide to the derailleur. The thermoplastic connector injection molds the pivot shaft to one of the inner and outer side plates.

In one embodiment of the present invention, a side plate is made of aluminum or a fiber-reinforced material such as a duroplastic carbon fiber or fiberglass, and the pivot shaft is made of a high-strength material such as steel. The side plate may have several openings or recesses proximate the connection point with the pivot shaft. The pivot shaft has a torque-transmitting connection with thermoplastic connector, for example, a non-round contour or a plurality of teeth or knurls. During assembly, the side plate and the pivot shaft are placed in an injection molding tool and bonded with a thermoplastic material. The thermoplastic material penetrates into the openings of the side plate and the torque features of the pivot shaft to form the thermoplastic connector, providing a positive connection between the side plate and the pivot shaft. The connector may partially surround the pivot shaft and the side part. The connector provides a positive connection, more resistant to temperature or vibrations under use.

The present invention provides a pivot shaft and a side plate that are precisely aligned and securely connected to each other. Further, the side plate and the pivot shaft are connected without contacting each other thereby eliminating the need for metallic inserts, typically required to brace fiber-reinforced materials. The present invention eliminates the damage that may be caused to the fiber-reinforced material by a non-positive connection such as by force-fitting a metal part.

In another embodiment of the present invention, the thermoplastic connector may also function as a protector for joining bearing points. The connector may include a sealing edge that extends from one or both sides of the side plate to cover the bearing of the guide pulley on one side of the side plate and to cover a chain guide receptacle of the bicycle derailleur that receives the pivot shaft on the other side of the side plate.

These and other features and advantages of the present invention will be more fully understood from the following description of one or more embodiments of the invention, taken together with the accompanying drawings.

DETAILED DESCRIPTION

Figure 1:
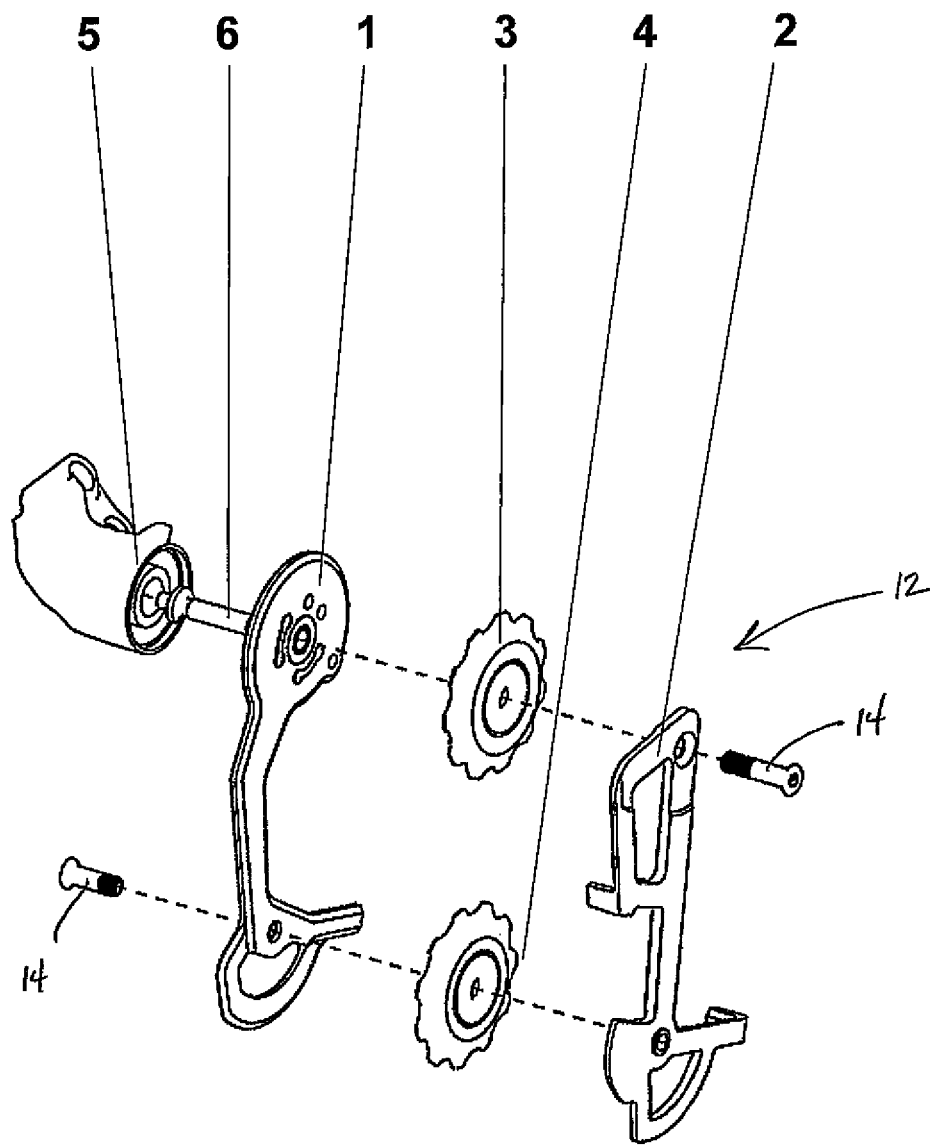
FIG. 1 is an exploded view of a chain guide according to one embodiment of the present invention.

FIGS. 1-2 illustrate a chain guide 12 for a bicycle derailleur according to one embodiment of the present invention. The chain guide 12 includes outer and inner side plates 1, 2, guide and tension pulleys 3, 4 and a pivot shaft 6. The pivot shaft 6 is connected to a chain guide receptacle or knuckle 5 of the bicycle derailleur. The outer and inner side plates 1, 2 are connected to each other by screws 14 which also form the axes for the guide pulley 3 and the tension pulley 4. The guide pulley 3 and the tension pulley 4 rolllingly receive a bicycle chain (not shown). To move the chain between gears, the chain guide 12 is displaced about the pivot shaft 6 which supports the chain guide 12 on the receptacle 5.

Figures 2A, 2B:
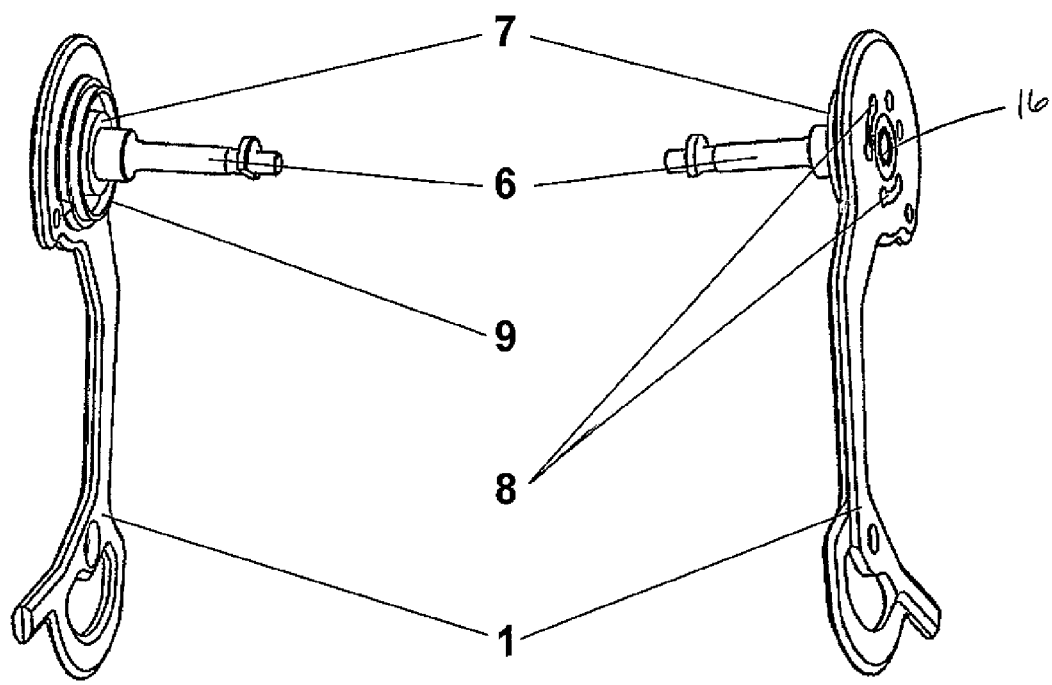
FIGS. 2a and 2b are perspective side views of an outer side plate of the chain guide of FIG. 1.

Looking to FIGS. 2a and 2b, a thermoplastic connector 7 connects the outer side plate 1 to the pivot shaft 6. The outer side plate 1 includes openings 8 to receive the thermoplastic connector 7. The outer side plate 1 may be made of a lightweight material such as aluminum or a duroplastic carbon-fiber material, and the pivot shaft 6 may be made of a high-strength material such as steel or a fiber-reinforced material. During assembly, the outer side plate 1 is placed in an injection molding tool and the pivot shaft 6 is positioned in a shaft opening 16 of the outer side plate 1. A thermoplastic material is injected into the mold to penetrate the knurled contour of the pivot shaft 6 and fill the openings 8 and the shaft opening 16 of the outer side plate 1, thereby forming the thermoplastic connector 7 and providing a positive connection between the outer side plate 1 and the pivot shaft 6. As a result of the injection molding process, the outer side plate 1, the pivot shaft 6, and the thermoplastic connector 7 form a bonded, single-piece assembly. To provide additional axial support for the pivot shaft 6, the connector 7 may extend beyond the outer surface of the outer side plate 1. Further, the connector 7 may have an annular sealing edge 9 that sealingly covers the connection between the chain guide 12 and the chain guide receptacle 5.

Figure 3:
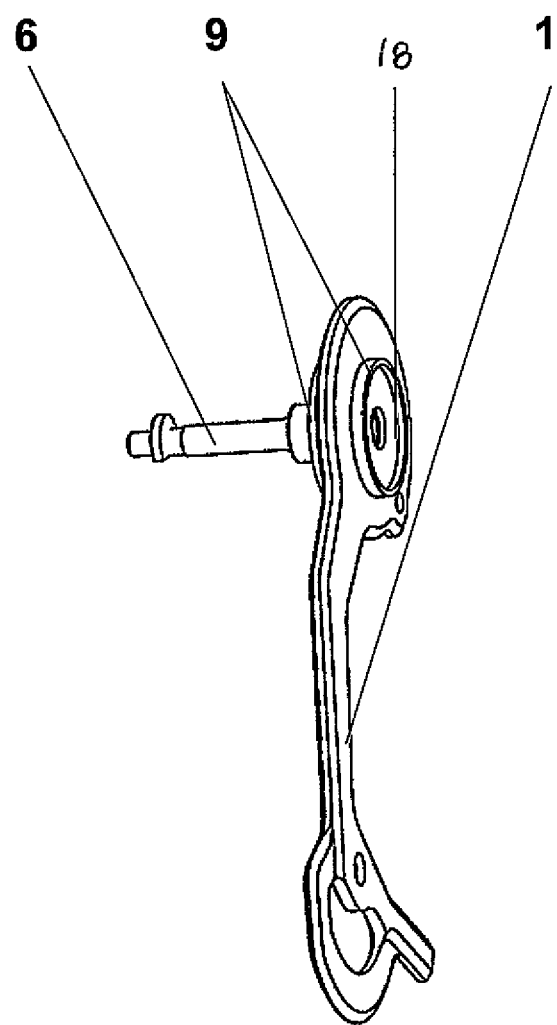
FIG. 3 is a perspective side view of an outer side plate of a chain guide according to another embodiment of the present invention.

FIG. 3 illustrates another embodiment of a thermoplastic connector 18 that may be used to connect the pivot shaft 6 to the outer side plate 1. The connector 18 has annular sealing edges 9 extending from both sides of the outer side plate 1. The edges 9 extend the axial coverage along the pivot shaft 6 and also function to sealingly cover the chain guide receptacle 5 and a bearing of the guide pulley 3.

Figure 4:
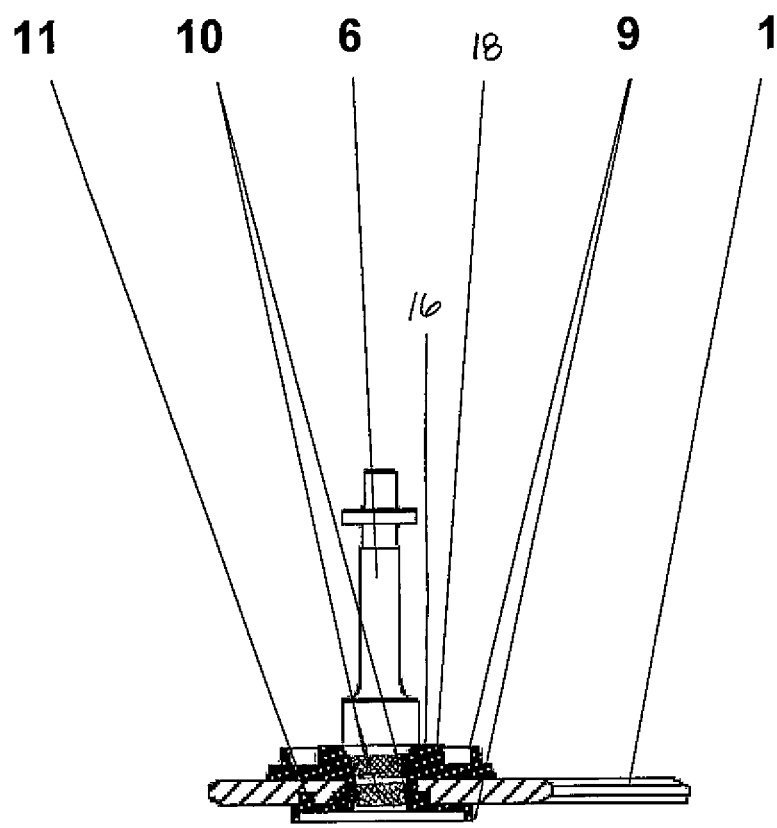
FIG. 4 is a cross-sectional view of the outer side plate of FIG. 3.

FIG. 4 shows a cross-section of the thermoplastic connector 18. The outer side plate 1 is made of lightweight material such as aluminum or a carbon fiber-reinforced material, and the pivot shaft 6 is made of a high-strength material such as steel. The thermoplastic connector 18 bonds to knurls 10 of the pivot shaft 6 and protrudes or extends beyond the outer side plate 1. The connector 18 provides a no contact connection between the pivot shaft 6 and the outer side plate 1. The outer side plate 1 is attached to the connector 18 by the thermoplastic material filling the recesses 11 and the shaft opening 16 in the outer side plate 1. The connector 18 includes sealing edges 9 that are disposed on both sides of the outer side plate 1. The sealing edge 9 on the pivot shaft side of outer side plate 1 protects the chain guide receptacle 5 from dirt, while the sealing edge 9 on the other side of the outer side plate 1 seals a bearing of the guide pulley 3.

While this invention has been described by reference to one or more embodiments, it should be understood that numerous changes could be made within the spirit and scope of the inventive concepts described. Accordingly, it is intended that the invention not be limited to the disclosed embodiment, but that it have the full scope permitted by the language of the following claims.

What is claimed:

1. A chain guide of a bicycle derailleur for displacing a chain between gears, the chain guide comprising:
   an inner side plate;
   an outer side plate;
   a pivot shaft pivotably connecting the chain guide to the bicycle derailleur; and
   a thermoplastic connector injection molding the pivot shaft non-rotatably to one of the inner and outer side plates to form a torque connection therebetween without contact between the pivot shaft and the one of the inner and outer side plates.

2. The chain guide of claim 1, wherein at least one of inner and outer side plates is made of a lightweight material and includes openings disposed proximate the pivot shaft for receiving the thermoplastic connector.

3. The chain guide of claim 2, wherein at least one of the inner and outer side plates is made of one of lightweight metal and fiber-reinforced material.

4. The chain guide of claim 3, wherein the pivot shaft is made of a high-strength material.

5. The chain guide of claim 4, wherein the pivot shaft is connected to the one of the inner and outer side plates by one of a non-round contour, a plurality of teeth and a plurality of knurls.

6. The chain guide of claim 5, wherein the pivot shaft is made of steel.

7. The chain guide of claim 6, wherein at least one of the inner and outer side plates includes a shaft opening for receiving the pivot shaft, the shaft opening being sufficiently larger than the pivot shaft to accommodate the pivot shaft and the thermoplastic connector.

8. The chain guide of claim 7, wherein the thermoplastic connector is injection molded to partially surround one of the inner and outer side plates and the pivot shaft.

9. The chain guide of claim 8, further comprising first and second pulleys disposed between the inner and outer side plates and rollingly receiving the chain.

10. The chain guide of claim 9, wherein the thermoplastic connector includes a sealing edge that extends from a side of one of the inner and outer side plates to form a sealing cover with a chain guide receptacle of the bicycle derailleur that receives the pivot shaft.

11. The chain guide of claim 9, wherein the thermoplastic connector includes sealing edges extending from both sides of one of the inner and outer side plates, one sealing edge forms a sealing cover with a chain guide receptacle of the bicycle derailleur that receives the pivot shaft and the other sealing edge forms a sealing cover with a bearing for a pulley of the chain guide.

12. The chain guide of claim 1, wherein the thermoplastic connector is injected molded to partially surround one of the inner and outer side plates and the pivot shaft.

13. The chain guide of claim 1, wherein the thermoplastic connector includes a sealing edge that extends from a side of one of the inner and outer side plates to form a sealing cover with a chain guide receptacle of the bicycle derailleur that receives the pivot shaft.

14. The chain guide of claim 1, wherein the thermoplastic connector includes sealing edges extending from both sides of one of the inner and outer side plates, one sealing edge forms a sealing cover with a chain guide receptacle of the bicycle derailleur that receives the pivot shaft and the other sealing edge forms a sealing cover with a bearing for a pulley of the chain guide.

15. The chain guide of claim 1, further comprising first and second pulleys disposed between the inner and outer side plates and rollingly receiving the chain.

16. The chain guide of claim 1, wherein the pivot shaft is made of a high-strength material.

17. The chain guide of claim 16, further comprising first and second pulleys disposed between the inner and outer side plates and rollingly receiving the chain.

18. The chain guide of claim 17, wherein the pivot shaft is connected to the one of the inner and outer side plates by one of a non-round contour, a plurality of teeth and a plurality of knurls.

19. The chain guide of claim 18, wherein the pivot shaft is made of steel.

* * * * *